UNITED STATES PATENT OFFICE.

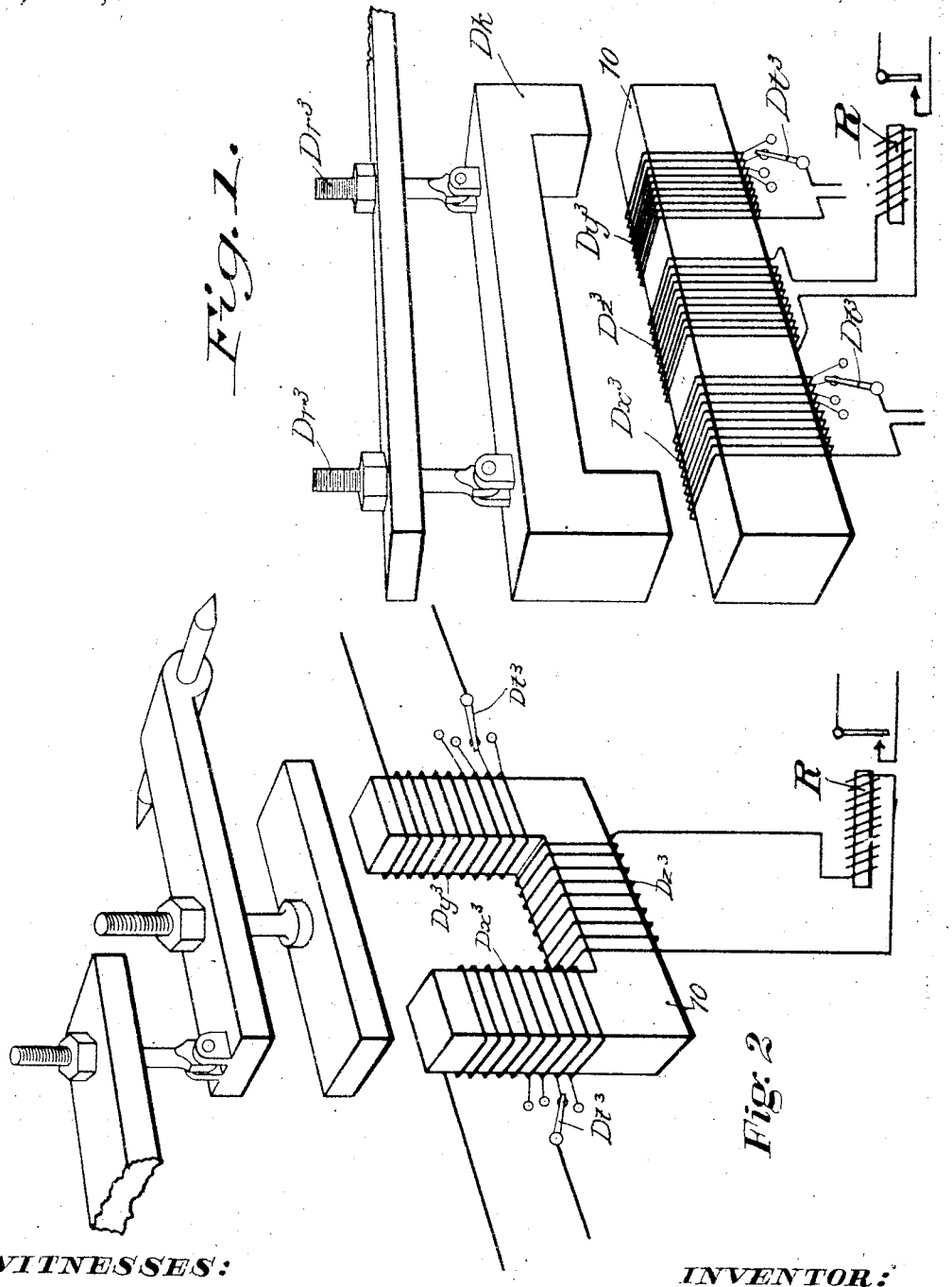

RUDOLPH F. SCHUCHARDT, OF CHICAGO, ILLINOIS.

APPARATUS FOR POWER DISTRIBUTION.

1,210,765.

Specification of Letters Patent.

Patented Jan. 2, 1917.

Application filed January 12, 1912. Serial No. 670,833.

*To all whom it may concern:*

Be it known that I, RUDOLPH F. SCHUCH-ARDT, a citizen of the United States, residing at Chicago, in the county of Cook and State of Illinois, have invented certain new and useful Improvements in Apparatus for Power Distribution, of which the following is a full, clear, concise, and exact description, reference being had to the accompanying drawings, forming a part of this specification.

My invention relates to apparatus for the transformation or distribution of electrical energy. Its object is to protect the apparatus and circuits of an electrical system against faults which may occur in a part only of the system.

A modern electric power system ordinarily comprises a number of districts or territories which consume current, each district being supplied from a substation which receives the power to be distributed from one or more distant generating stations. In order to secure the desired flexibility of the system as a whole, it is the practice to provide circuits interconnecting the substations, perhaps also the generating stations, so that any part of the system may in so far as possible supply or aid in supplying the demand or part of the demand upon any other part of the system. The final distribution of current is usually at comparatively low tension and may be either alternating current or direct. The energy as supplied from the generating stations and between the several substations is generally in the form of alternating current at high tension. Transformers or converters are used to step the tension of the current up or down as may be required.

A fault may develop at any time in any part of such a system as, for example, in a transformer, a transmission line or a tie line. My invention provides means for automatically disconnecting from an operating system that part in which a fault develops, leaving the balance of the system intact and in operating condition.

In accordance with my invention, each phase of each circuit or piece of apparatus to be protected and automatically cut out of the system in case of a fault is provided at either end with a current transformer. In a three phase system the currents derived from the secondaries of these current transformers at either side or end of the apparatus or circuit to be protected are led through the windings of a three-phase-single-phase transformer and the current derived in turn from the secondary of this three-phase-single-phase transformer is led through the windings of a differential inductive relay. In this three-phase-single-phase transformer one of the primary windings is reversed with respect to the other two, so there will be a flux set up in the core at all times when current is flowing in the line or in the apparatus to be protected. The currents derived from either side or end of the apparatus or circuit to be protected act opposingly upon a secondary coil, with which each differential inductive relay is provided. Under normal conditions, a given amount of energy flows into the circuit or apparatus at one end and substantially the same amount of energy flows out of the circuit or apparatus at the other end. Under such conditions, the currents derived from the energy flowing at both ends of the circuit or apparatus counterbalance one another in their effect upon the secondary of the differential inductive relay. When, however, a fault develops between the two ends of the apparatus or circuit to be protected the balance will be disturbed and the amount of energy at one end of the circuit or apparatus will be greater than that at the other end, or energy will flow into the faulty circuit or apparatus from both ends instead of flowing in at one end and out at the other as under normal conditions. In either case the balance of the currents acting inductively upon the secondary of the differential inductive relay will be disturbed and a current will be caused to flow in that secondary winding.

The secondary winding of the differential inductive relay is connected with switching mechanism adapted when energized to operate or control the operation of switching mechanism adapted to cut the faulty apparatus or circuit out of the system.

The differential inductive relay and the circuits with which it is associated constitute the subject-matter of my present invention.

The advantages of the invention will more fully appear from a description of the details of certain embodiments of my invention as shown in the accompanying drawings, wherein—

Figure 1 diagrammatically illustrates one form of the differential inductive relay; Fig. 2 illustrates a modified form of this relay.

Referring first to Fig. 1, there is shown an iron core 10 upon which the transformer coils $Dx^3$, $Dz^3$, and $Dy^3$ are wound. An iron keeper is shown at $Dk$. The adjusting screws $Dr^3$ provide a means for regulating the air gap between the two ends of the keeper and the core upon which the coils of the differential inductive relay are wound. Taps brought out from the coils $Dx^3$ and $Dy^3$ enable the switches $Dt^3$ to coöperate in varying the number of effective turns of the coils with which they are associated. The adjustments are designed for use in balancing the effects of the coils $Dx^3$ and $Dy^3$ with respect to the secondary coil $Dz^3$ when the conditions upon the transmission line or tie line are normal and also to permit a maximum degree of sensitiveness to be attained. The direction in which the coils $Dx^3$ and $Dy^3$ are wound and connected is such that their fluxes will be in opposition. The magnetic effect of each of the primary coils is regulated by the switches $Dt^3$ and the leaking flux by means of the adjustable keeper, so that no current will be induced under normal conditions in the winding $Dz^3$.

A modified form of differential inductive relay is shown in Fig. 2. In this form the transformer coils are wound upon a U-shaped core, the keeper being substantially straight. This modified form shows also a different mechanism for adjusting the air gaps in the magnetic circuit. The drawing is in diagrammatic shape and will need no explanation in addition to that already given in connection with Fig. 1.

By means of the double adjustment of the magnetic return path it is possible to adjust the same with a greater degree of accuracy than would be the case if the keeper, or path, were constructed to move toward or away from the core only as a whole. For example, if the entire return path were moved toward the core to shorten the air gap, say, $\frac{1}{64}$ of an inch the keeper would have to be moved $\frac{1}{128}$ of an inch, which would hardly be possible unless the adjusting means were made very delicate. In the device illustrated in Fig. 1 it would be necessary only to move one end of the path $\frac{1}{64}$ of an inch toward the core, thereby decreasing the air gap $\frac{1}{128}$ of an inch. In other words, the independent adjustment permits a larger amount of movement of the adjusting means than the simultaneous adjustment.

In Fig. 2 one end of the keeper may also be moved toward or away from the core substantially independent of the other end.

Each one of the coils $Dz^3$ is electrically connected to a relay R which controls a second electric circuit as shown.

The operation of the device is as follows: A suitable source of current is provided for each of the primary windings $Dx^3$ and $Dy^3$ so that currents traversing the primary windings of the differential inductive relay are in opposition to each other and the keeper of this relay is adjusted to prevent the induction of any current in the winding $Dz^3$ under normal operating conditions. When, however, a fault occurs in the lines furnishing current to one of the coils $Dx^3$ and $Dy^3$, the current derived from the faulty line cannot balance and oppose the current derived from the other of said lines. Either one current will be stronger than the other or the two currents will flow in the same direction around the core of the differential inductive relay. In either case a current will be induced in the winding $Dz^3$ to actuate the relay R which may be arranged by means of a second electric circuit to effectively disconnect the faulty line from the system of which it forms a part.

I claim:

1. In an inductive differential relay, the combination of a core, differential windings mounted thereon, a secondary winding mounted thereon, a magnetic return path for said core, adjusting mechanism for moving one end of the return path farther from the core than the other end if desired and for moving the return path toward or away from both ends of the core as desired and translating devices connected with said secondary winding.

2. In an inductive differential relay, the combination of a core, differential windings mounted thereon, a secondary winding mounted thereon, a magnetic return path for said core, an adjusting device secured to each end of the return path for moving it toward or away from said core independently of the other end of said return path and translating devices connected with said secondary winding.

In witness whereof, I hereunto subscribe my name this ninth day of January, A. D. 1912.

RUDOLPH F. SCHUCHARDT.

Witnesses:
C. A. KELLER,
J. C. FOSS.